United States Patent
Sukegawa et al.

(10) Patent No.: US 10,237,886 B2
(45) Date of Patent: Mar. 19, 2019

(54) COMMUNICATION RELAY DEVICE AND COMMUNICATION RELAY METHOD

(71) Applicant: FUJITSU LIMITED, Kawasaki-shi, Kanagawa (JP)

(72) Inventors: Shotaro Sukegawa, Kawasaki (JP); Yusuke Kobayashi, Kawasaki (JP)

(73) Assignee: FUJITSU LIMITED, Kawasaki-Shi (JP)

( * ) Notice: Subject to any disclaimer, the term of this patent is extended or adjusted under 35 U.S.C. 154(b) by 98 days.

(21) Appl. No.: 15/630,591

(22) Filed: Jun. 22, 2017

(65) Prior Publication Data
US 2018/0014319 A1 Jan. 11, 2018

(30) Foreign Application Priority Data
Jul. 11, 2016 (JP) .................. 2016-136674

(51) Int. Cl.
*H04W 72/12* (2009.01)
*H04B 7/155* (2006.01)
(Continued)

(52) U.S. Cl.
CPC .... *H04W 72/1257* (2013.01); *H04B 7/15528* (2013.01); *H04W 76/10* (2018.02);
(Continued)

(58) Field of Classification Search
CPC combination set(s) only.
See application file for complete search history.

(56) References Cited

U.S. PATENT DOCUMENTS

2010/0061226 A1 3/2010 Morishige et al.
2011/0269499 A1* 11/2011 Vikberg ................ H04W 28/08
455/524

(Continued)

FOREIGN PATENT DOCUMENTS

JP 2009-55357 3/2009
JP 2010-63022 3/2010

*Primary Examiner* — Zhiren Qin
(74) *Attorney, Agent, or Firm* — Staas & Halsey LLP

(57) ABSTRACT

There is provided a communication relay device including at least one memory, and at least one processor coupled to the at least one memory, respectively, and the at least one processor configured to relay messages exchanged between a first wireless-base-station and a first wireless-network-side-device, or between a second wireless-base-station and a second wireless-network-side-device, acquire, from the messages, first and second statistic-information related to call processing between first and second wireless-base-stations and first and second wireless-network-side-devices, respectively, determine, in accordance with a number of first and second terminal-devices coupled to the first and second wireless-base-stations, respectively, included in first second statistic-information, respectively, an order of establishment of first and second communication sessions between the first and second wireless-base-stations and the first and second wireless-network-side-devices, respectively, and establish, when switching of a path of relaying a communication is performed, the first and second communication sessions in accordance with the order of establishment.

11 Claims, 11 Drawing Sheets

(51) Int. Cl.
*H04W 76/10* (2018.01)
*H04W 88/12* (2009.01)
*H04W 84/04* (2009.01)
*H04W 92/12* (2009.01)
*H04W 80/06* (2009.01)
*H04W 92/14* (2009.01)

(52) U.S. Cl.
CPC .......... *H04W 80/06* (2013.01); *H04W 84/045* (2013.01); *H04W 88/12* (2013.01); *H04W 92/12* (2013.01); *H04W 92/14* (2013.01)

(56) References Cited

U.S. PATENT DOCUMENTS

| | | | |
|---|---|---|---|
| 2012/0069737 A1* | 3/2012 | Vikberg | H04W 28/12 370/232 |
| 2013/0250749 A1 | 9/2013 | Morishige et al. | |
| 2015/0257180 A1* | 9/2015 | Liu | H04L 41/0803 455/452.1 |
| 2015/0296547 A1* | 10/2015 | Liu | H04W 16/26 455/449 |
| 2016/0007255 A1* | 1/2016 | Sharma | H04W 36/08 370/331 |

\* cited by examiner

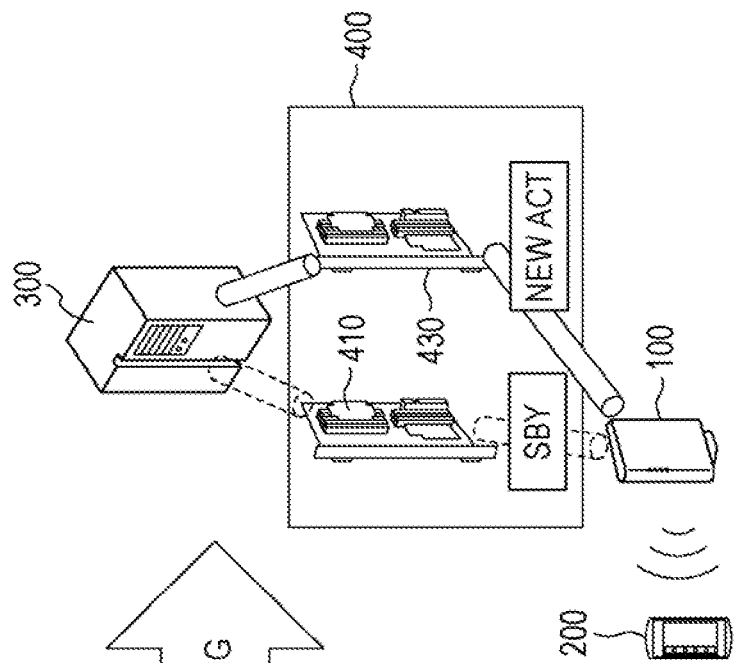
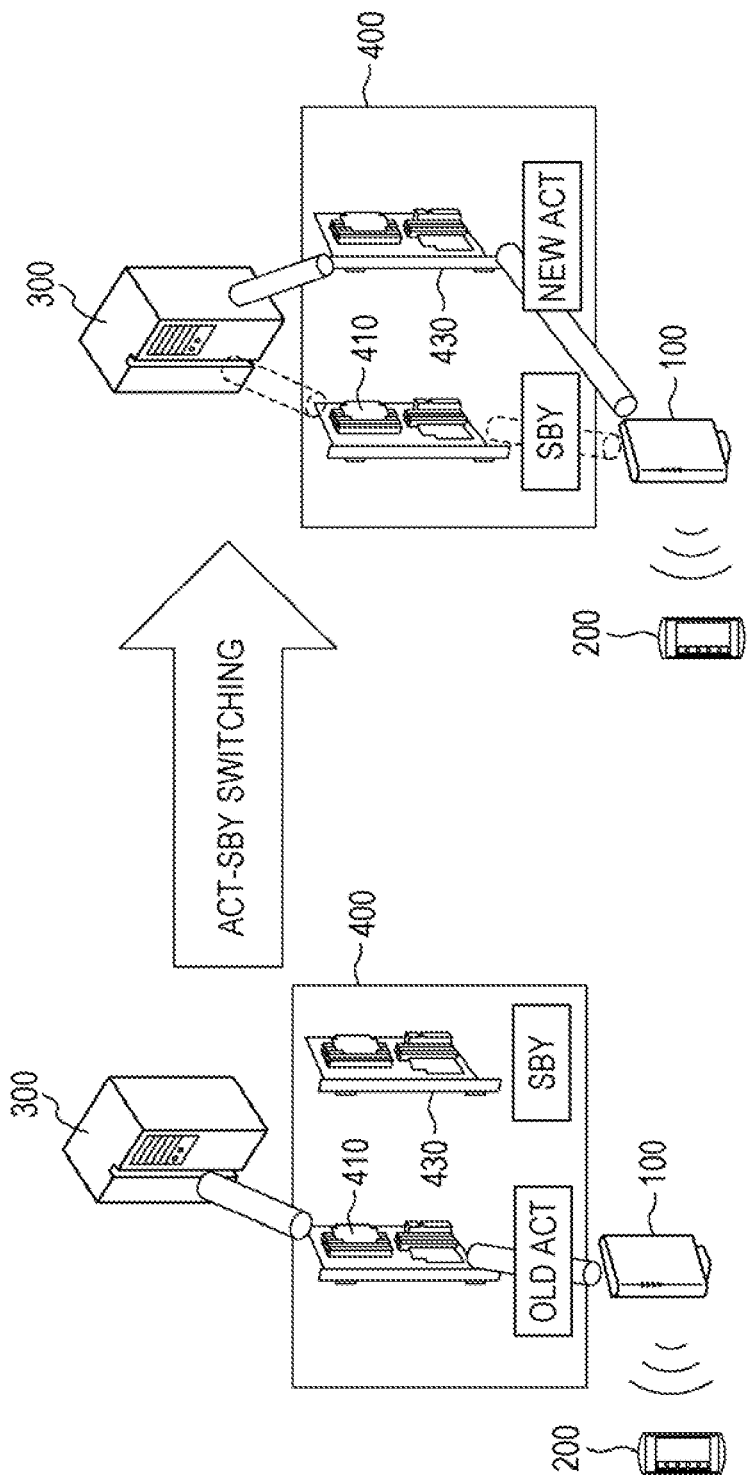

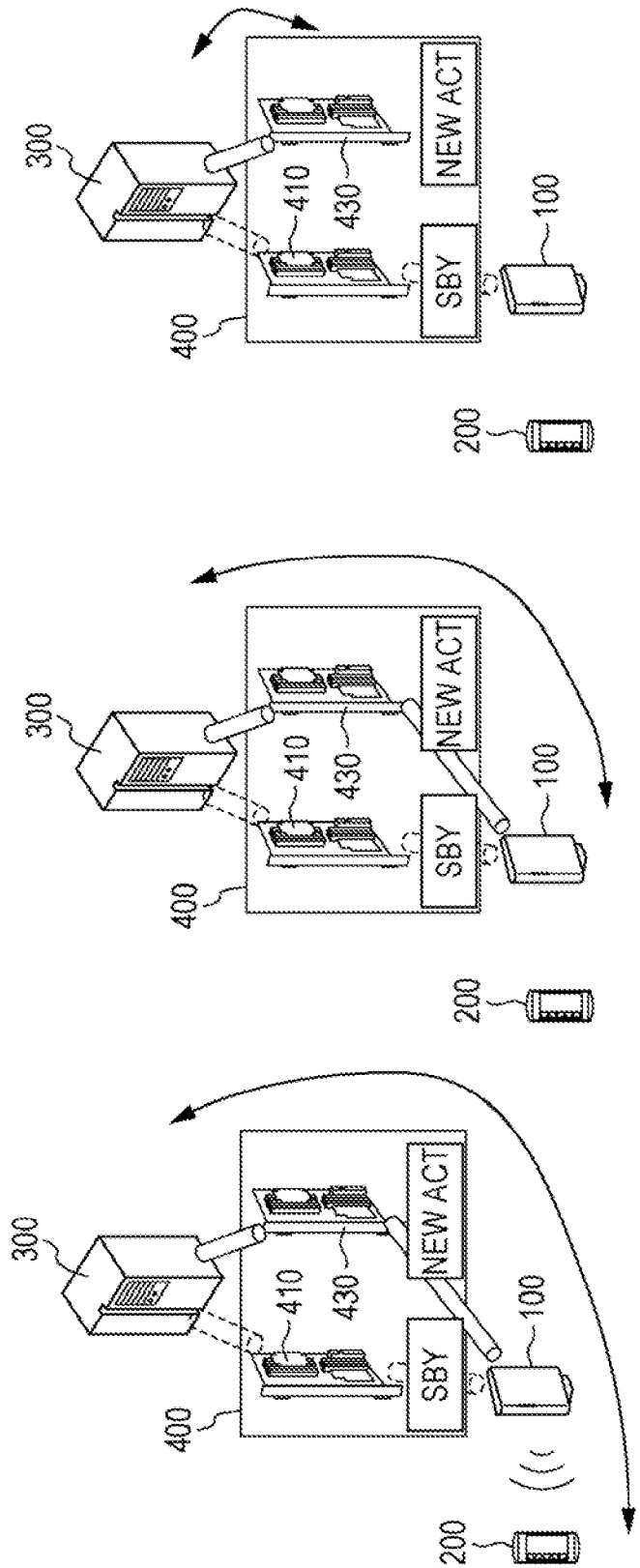

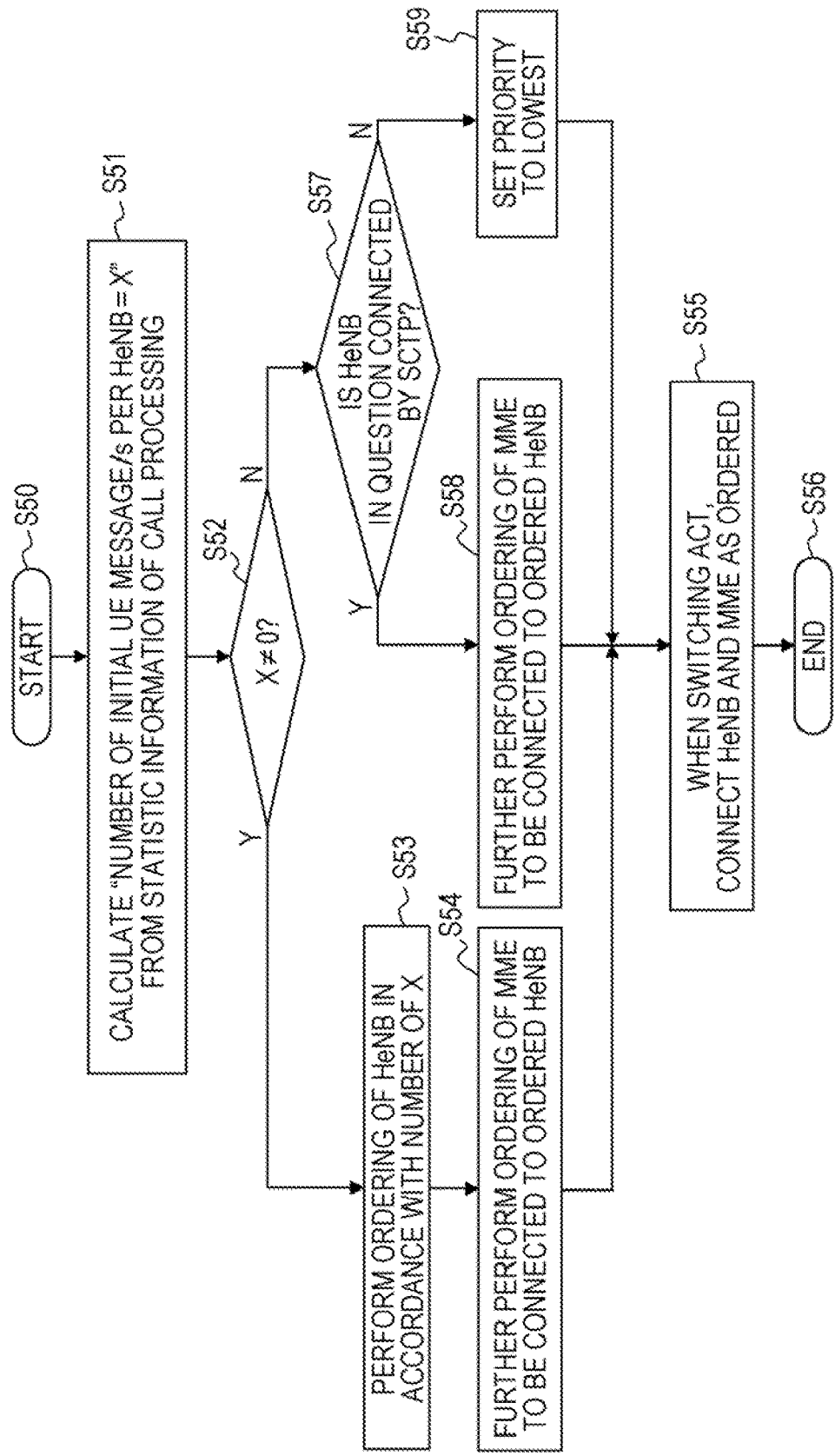

COMMUNICATION RELAY DEVICE AND COMMUNICATION RELAY METHOD

CROSS-REFERENCE TO RELATED APPLICATION

This application is based upon and claims the benefit of priority of the prior Japanese Patent Application No. 2016-136674, filed on Jul. 11, 2016, the entire contents of which are incorporated herein by reference.

FIELD

The embodiments discussed herein are related to a communication relay device and a communication relay method.

BACKGROUND

Recently, in wireless communication, a femtocell system is gaining attention. The femtocell system is a system that has a cell range (or a service providable range) narrower than that of a macro cell system and provides the service to a terminal (or a user) present in the cell range, for example. The femtocell system is installed in a house, an office, or a stadium, for example, and is thought to enable improvement enhanced in both a service providable range and communication data capacity together with a macro cell system.

A Home evolved Node B (HeNB) in the femtocell system has a narrower cell range than an evolved Node B (eNB) in the macro cell system, and a number of installed HeNBs thus tends to be greater than that of the eNBs. Accordingly, a number of HeNBs connected to a mobility management entity (MME) also tends to be greater than that of the eNBs in the macro cell system. For this reason, in some cases, a Home evolved Node B-Gateway (HeNB-GW) is installed between a mobility management entity (MME) and the Home evolved Nodes Bs (HeNB). This enables reduction of loads in the MME, for example.

Meanwhile, the HeNB-GW has a redundant configuration of an active system (hereinafter, may be referred to as an "ACT system") and a standby system (hereinafter, may be referred to as an "SBY system") in some cases. With the HeNB-GW, when a failure occurs, an instruction is made by a monitoring device, or other, the ACT system is switched to the SBY system, whereby continuity of communication is able to be secured, for example.

Regarding techniques in this kind of field, matters described below are available, for example. That is to say, a node device is available that divides, in stages, resource allocation with respect to a communication path based on a communication path setting request from other node and transmits a control message in stages in accordance with information on a resource allocation schedule including an execution timing of each step, for example.

With this technique, resource allocation is performed in stages with respect to a communication path in failure recovery. This is thought to enable to avoid a situation in which a resource is occupied by a particular communication path, in a condition in which requests for communication path allocation are generated in a short period of time in a concentrated manner.

Furthermore, an access gateway device is available that includes a plurality of controlling computers that establish a communication path and determine information for transfer of data and a plurality of transferring computers that transfer data to a communication path of the information for transfer. When a failure occurs, one of the pluralities of computers succeeds processing.

This technique is thought to enable to provide an optimal redundant configuration for an access gateway device with which a control plane and a user plane are separated, reduce a downtime when a failure occurs while controlling the cost of the device, and reinforce the user plane in accordance with an increase in user data.

Japanese Laid-open Patent Publication No. 2009-55357 and Japanese Laid-open Patent Publication No. 2010-63022 are examples of related art.

SUMMARY

According to an aspect of the invention, a communication relay device configured to relay communication between a plurality of terminal devices and a plurality of wireless network side devices via a plurality of wireless base stations, the communication relay device includes at least one memory, and at least one processor coupled to the at least one memory, respectively, and the at least one processor configured to relay messages exchanged between a first wireless base station of the plurality of wireless base stations and a first wireless network side device of the plurality of wireless network side devices, or between a second wireless base station of the plurality of wireless base stations and a second wireless network side device of the plurality of wireless network side devices, acquire, from the messages, first statistic information related to call processing between the first wireless base station and the first wireless network side device and second statistic information related to call processing between the second wireless base station and the second wireless network side device, determine, in accordance with a number of first terminal devices of the plurality of terminal devices coupled to the first wireless base station included in the first statistic information and a number of second terminal devices of the plurality of terminal devices coupled to the second wireless base station included in the second statistic information, an order of establishment of a first communication session between the first wireless base station and the first wireless network side device and a second communication session between the second wireless base station and the second wireless network side device, and establish, when switching of a path of relaying the communication in the communication relay device is performed, the first communication session and the second communication session in accordance with the order of establishment.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIGS. 6A and 6B are diagrams illustrating an example of switching;

FIGS. 7A to 7C are diagrams illustrating examples of priority orders;

FIG. 11 is a flowchart illustrating an operation example.

DESCRIPTION OF EMBODIMENTS

In a femtocell system, a number of terminals connected to one HeNB is different from a number of terminals connected to other HeNB in some cases. In such a case, when switching from an ACT system to an SBY system is performed in an HeNB-GW, there is a possibility that provision of a service is interrupted in a terminal receiving the provision of the service via an HeNB, depending on the order of processing related to the switching. For example, there is a case where the processing related to the switching is performed in the HeNB-GW earlier for an HeNB to which a number of terminals smaller than a threshold is connected than for an HeNB to which a number of terminals greater than the threshold is connected. Because the processing related to the switching is performed later for the terminal connected to the latter HeNB than for the terminal connected to the former HeNB, there is a possibility that the provision of the service is interrupted due to turn waiting for the processing, for example. Furthermore, this kind of interruption deteriorates quality of the service in some cases.

Regarding both a technique of transmitting a control message in stages in accordance with a resource allocation schedule and a technique with which a redundant configuration is used with respect to controlling computers and transferring computers, no consideration is given to a possibility that provision of a service is interrupted in a terminal due to the order of the processing related to the switching. For this reason, with these techniques, there are cases where continuity of a service is not able to be secured or quality of the service is deteriorated.

With reference to the drawings, embodiments for performing a technique of continuing provision of a service and improving quality of the service will be described below. Note that the embodiments below are not intended to limit the disclosed techniques. Furthermore, forms of the embodiments may be combined as appropriate as long as processing contents do not contract one another.

Furthermore, with respect to terms and technical contents described herein, terms and technical contents described in a specification as a standard related to communication, such as 3GPP, may be used as appropriate.

First Embodiment

Figure 1:
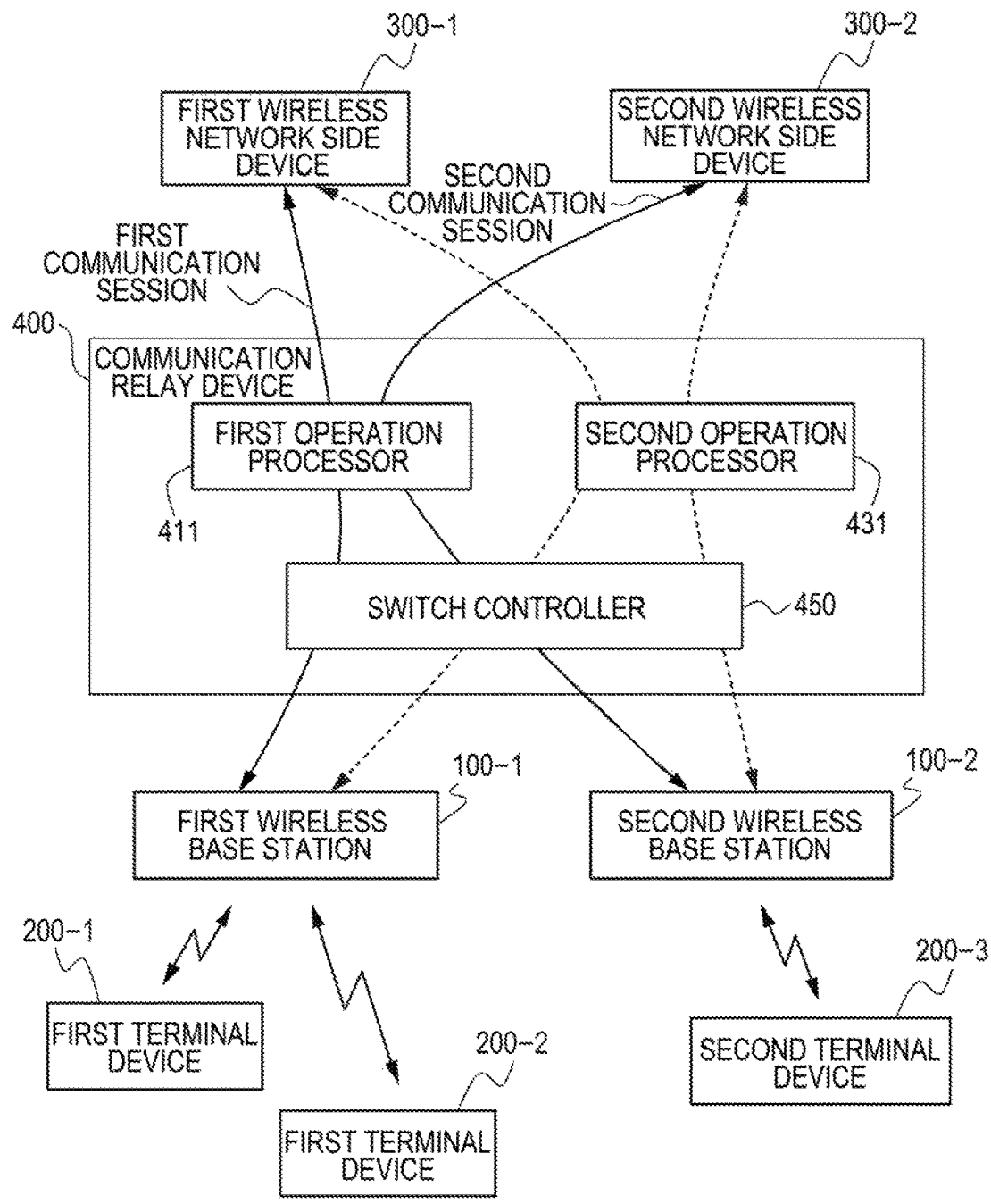
FIG. 1 is a diagram illustrating a configuration example of a communication system.

A first embodiment will be described. FIG. 1 illustrates a configuration example of a communication system 10 in the first embodiment.

The communication system 10 includes a first wireless base station 100-1, a second wireless base station 100-2, first terminal devices 200-1 and 200-2, a second terminal device 200-3, and a communication relay device 400. Note that the communication system 10 may include a first wireless network side device 300-1 and a second wireless network side device 300-2.

The first wireless base station 100-1 and the second wireless base station 100-2 are wireless communication devices that perform wireless communication with the first terminal devices 200-1 and 200-2 and the second terminal device 200-3 within a service providable range with respect to each of the first wireless base station 100-1 and the second wireless base station 100-2, for example. Furthermore, the first terminal devices 200-1 and 200-2 and the second terminal device 200-3 are wireless communication devices, for example, feature phones, smartphones, tablet terminals, or personal computers.

FIG. 1 illustrates an example in which the first wireless base station 100-1 performs wireless communication with the first terminal devices 200-1 and 200-2, and the second wireless base station 100-2 performs wireless communication with the second terminal device 200-3. Furthermore, the first wireless base station 100-1 is able to establish a first communication session with the first wireless network side device 300-1 via the communication relay device 400 to exchange messages. The second wireless base station 100-2 also is able to establish a second communication session with the second wireless network side device 300-2 via the communication relay device 400 to exchange messages.

The communication relay device 400 controls establishment of a communication session with a wireless base station, controls establishment of a communication session with a wireless network side device, and relays communication between a terminal device and a wireless network side device via a wireless base station. The communication relay device 400 includes a first operation processor 411, a second operation processor 431, and a switching controller 450.

When messages are exchanged between the first wireless base station 100-1 and the first wireless network side device 300-1 or between the second wireless base station 100-2 and the second wireless network side device 300-2, the first operation processor 411 relays the message.

The switching controller 450 performs switching from the first operation processor 411 to the second operation processor 431.

Before the switching, based on the message, the first operation processor 411 acquires first statistic information that indicates a number of the first terminal devices 200-1 connected to the first wireless base station 100-1 and second statistic information that indicates a number of the second terminal devices 200-3 connected to the second wireless base station 100-2. Thereafter, in accordance with the first statistic information and the second statistic information, the first operation processor 411 determines an order of establishment of the first communication session between the first wireless base station 100-1 and the first wireless network side device 300-1 and the second communication session between the second wireless base station 100-2 and the second wireless network side device 300-2.

After the switching, the second operation processor 431 establishes the first communication session and the second communication session in accordance with the order of establishment.

As described above, in the present first embodiment, the first operation processor 411 determines the order of establishment of the first communication session and the second communication session in accordance with the first statistic information and the second statistic information. With this, in the communication relay device 400, for example, after the switching from the first operation processor 411 to the second operation processor 431, it is possible to establish the first communication session in the first wireless base station 100-1, to which a greater number of terminal devices is connected than to the second wireless base station 100-2, earlier than establishing the second communication session. The communication relay device 400 thus establishes a communication session sequentially from a user connected to the first wireless base station 100-1. This enables to continue to provide a service to many users even when switching has been performed. In the communication relay device 400, continuation of the service is secured, enabling improvement in quality of the service.

Second Embodiment

Figure 2:
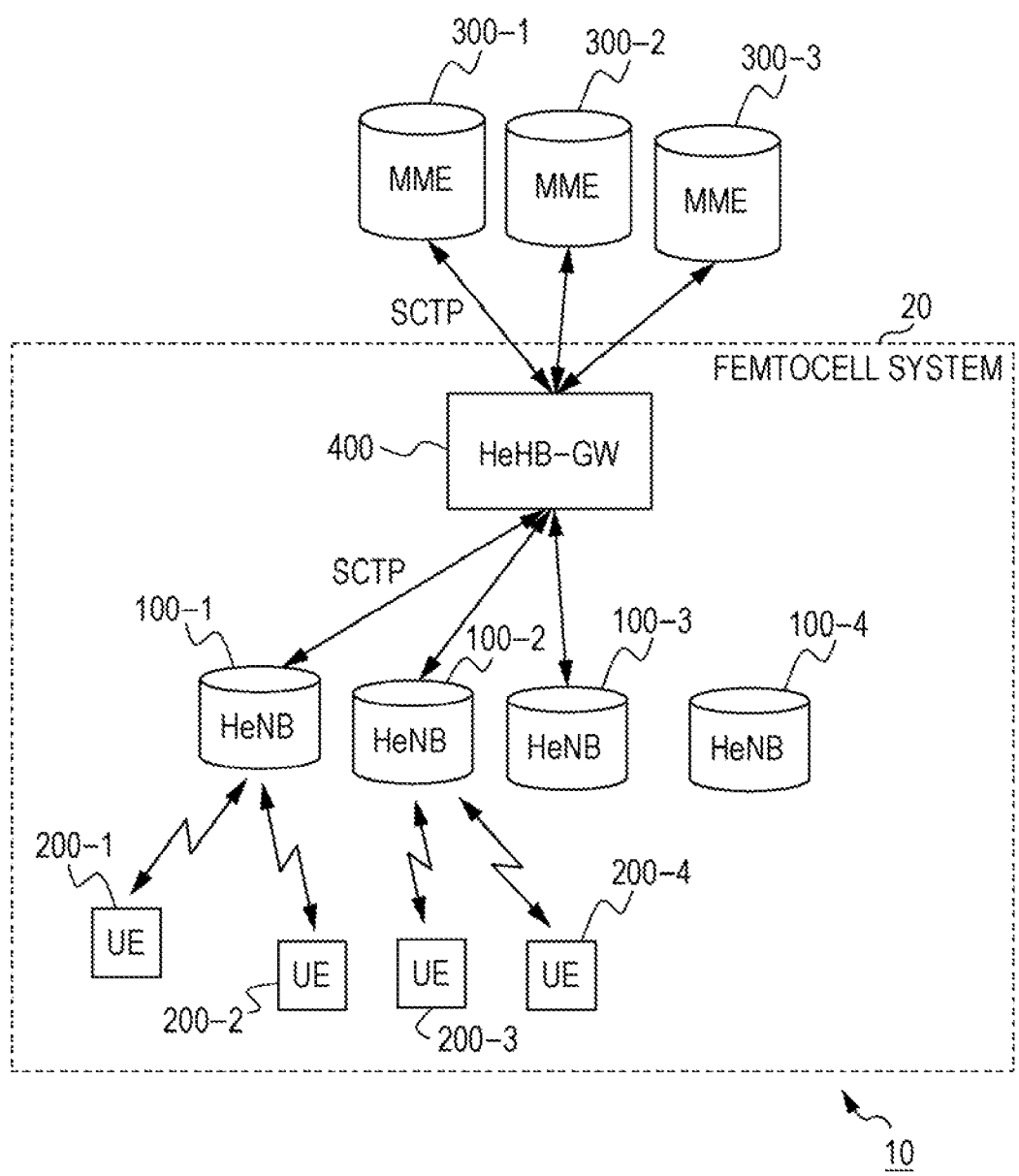
FIG. 2 is a diagram illustrating a configuration example of a communication system.

Next, a second embodiment will be described. FIG. 2 is a diagram illustrating a configuration example of the communication system 10 in the second embodiment.

The communication system 10 includes a plurality of HeNBs 100-1 to 100-4, a plurality of pieces of user equipment (UEs: user devices or terminal devices) 200-1 to 200-4, an HeNB-GW (or communication relay device) 400, and a plurality of MMEs 300-1 to 300-3.

Note that the HeNBs 100-1 and 100-2 respectively correspond to the first wireless base station 100-1 and the second wireless base station 100-2 in the first embodiment, for example. Furthermore, the UEs 200-1 and 200-3 respectively correspond to the first terminal device 200-1 and the second terminal device 200-3, for example. The MMEs 300-1 and 300-2 respectively correspond to the first wireless network side device 300-1 and the second wireless network side device 300-2, for example. The HeNB-GW 400 corresponds to the communication relay device 400, for example.

Each of the HeNBs 100-1 to 100-4 is a wireless communication device (or a wireless base station) that performs wireless communication with any of the UEs 200-1 to 200-4, for example. Each of the HeNBs 100-1 to 100-4 is able to provide various services such as a call service or a web browsing service to any of the UEs 200-1 to 200-4 that is present in a service providable range (or a cell range) with respect to each of the HeNBs 100-1 to 100-4, for example. The example in FIG. 2 illustrates an example in which the HeNB 100-1 performs wireless communication with the UEs 200-1 and 200-2 and the HeNB 100-2 performs wireless communication with the UEs 200-3 and 200-4. FIG. 2 also illustrates an example in which the HeNBs 100-3 and 100-4 do not perform wireless communication with any of the UEs 200-1 to 200-4.

Furthermore, the HeNBs 100-1 to 100-4 establish communication sessions with the MMEs 300-1 to 300-3 via the HeNB-GW 400 by stream control transmission protocol (SCTP) to exchange SCTP-related messages, for example.

SCTP is a connection type protocol that belongs to a fourth layer (or a transport layer) of an open systems interconnection (OSI) reference model and performs transmission while performing reception check, similarly to transmission control protocol (TCP), for example. With SCTP, transmission is performed with reception check combined with retransmission, for example. SCTP thus is thought to have high reliability with respect to transmission of data, a message, or the like, compared with UDP.

In FIG. 2, the HeNBs 100-1 to 100-3 have established communication sessions with the MMEs 300-1 to 300-3 via the HeNB-GW 400 by SCTP and are able to exchange messages, for example. By contrast, the HeNB 100-4 has the power source turned off and has not established a communication session with any of the MMEs 300-1 to 300-3, in the illustrated example.

Note that the communication sessions established between the MMEs 300-1 to 300-3 and the HeNBs 100-1 to 100-4 are referred to as SCTP connection or call, for example, in some cases. Each of the communication sessions is established with messages related to SCTP exchanged between the MMEs 300-1 to 300-3 and the HeNBs 100-1 to 100-4. A communication session may be present for each of the HeNBs 100-1 to 100-3, for example. When the HeNB 100-1 is connected by SCTP to the MME 300-1 and the HeNB 100-2 is connected by SCTP to the MME 300-2, for example, one communication session is established between the HeNB 100-1 and the MME 300-1 and another communication session is established between the HeNB 100-2 and the MME 300-2. When two HeNBs 100-1 and 100-2 are connected by SCTP to one MME 300-1, for example, one communication session is established between the HeNB 100-1 and the MME 300-1 and another communication session is established between the HeNB 100-2 and the MME 300-1.

The UEs 200-1 to 200-4 are wireless communication devices (or terminal devices), for example, feature phones, smartphones, tablet terminals, personal computers, or game devices. The UEs 200-1 to 200-4 are able to receive provision of various services by performing wireless communication with the HeNBs 100-1 to 100-4.

The MMEs 300-1 to 300-3 are wireless network side devices at a core network side, for example. The MMEs 300-1 to 300-3 contain or manage one or a plurality of HeNBs 100-1 to 100-4 and performs processing related to control such as move management, authentication, and setting of a transfer path of user data for the UEs 200-1 to 200-4 each connected to corresponding one of the HeNBs 100-1 to 100-4, for example.

Note that each of the MMEs 300-1 to 300-3 may be installed for each region. For example, the MME 300-1 may be for the Eastern Japan, the MME 300-2 may be for the Western Japan, and so on. As a connection form, to each of the MMEs 300-1 to 300-3, one of the HeNBs 100-1 to 100-3 may be connected, for example, the HeNB 100-1 may be connected to the MME 300-1, the HeNB 100-2 may be connected to the MME 300-2, and so on. Alternatively, a plurality of HeNBs 100-1 and 100-2 may be connected to one MME 300-1. The communication session described above may be present for each of the HeNBs 100-1 to 100-4 and set from each of the HeNBs 100-1 to 100-4 with one of the MMEs 300-1 to 300-4 that is connected thereto, for example.

The HeNB-GW 400 is a server device that relays between the HeNBs 100-1 to 100-4 and the MMEs 300-1 to 300-3, for example. The HeNB-GW 400 relays an SCTP-related message transmitted from the HeNB 100-1 to transmit the relayed message to the MME 300-1 or relays an SCTP-related message transmitted from the MME 300-1 to transmit the relayed message to the HeNB 100-1, for example.

In the present second embodiment, the HeNB-GW 400 has a redundant configuration of an active system (hereinafter, may be referred to as an "ACT system" or "ACT") and a standby system (hereinafter, may be referred to as an "SBY system" or "SBY"). The HeNB-GW 400 performs switching from an ACT system to an SBY system when a failure occurs or an instruction is made by a monitoring server, for example. When performing switching, the HeNB-GW 400 acquires statistic information related to call processing based on presence or absence of a message exchanged between the MMEs 300-1 to 300-3 and the HeNBs 100-1 to 100-4, a number of messages, or the like. The statistic information is a number of connected UEs for each of the HeNBs 100-1 to 100-4, for example. The HeNB-GW 400 determines the order of establishment of each communication session in accordance with the statistic information. After the switching from ACT to SBY, the HeNB-GW 400 establishes each communication session in accordance with the order of establishment. A configuration example and an operation example of the HeNB-GW 400 will be described later.

In FIG. 2, there is a case where the HeNBs 100-1 to 100-4, the UEs 200-1 to 200-4, and the HeNB-GW 400 are referred to as a femtocell system 20, for example. However, the femtocell system 20 may include the MMEs 300-1 to 300-3, for example, and in this case, the femtocell system 20 and the communication system 10 are the same system.

Note that each of the HeNBs 100-1 to 100-4 has the same configuration and thus is referred to as an HeNB 100 in some cases unless otherwise noted. Similarly, the UEs 200-1 to 200-4 and the MMEs 300-1 to 300-3 are also referred to as a UE 200 and a MME 300 respectively, unless otherwise noted.

Figure 3:
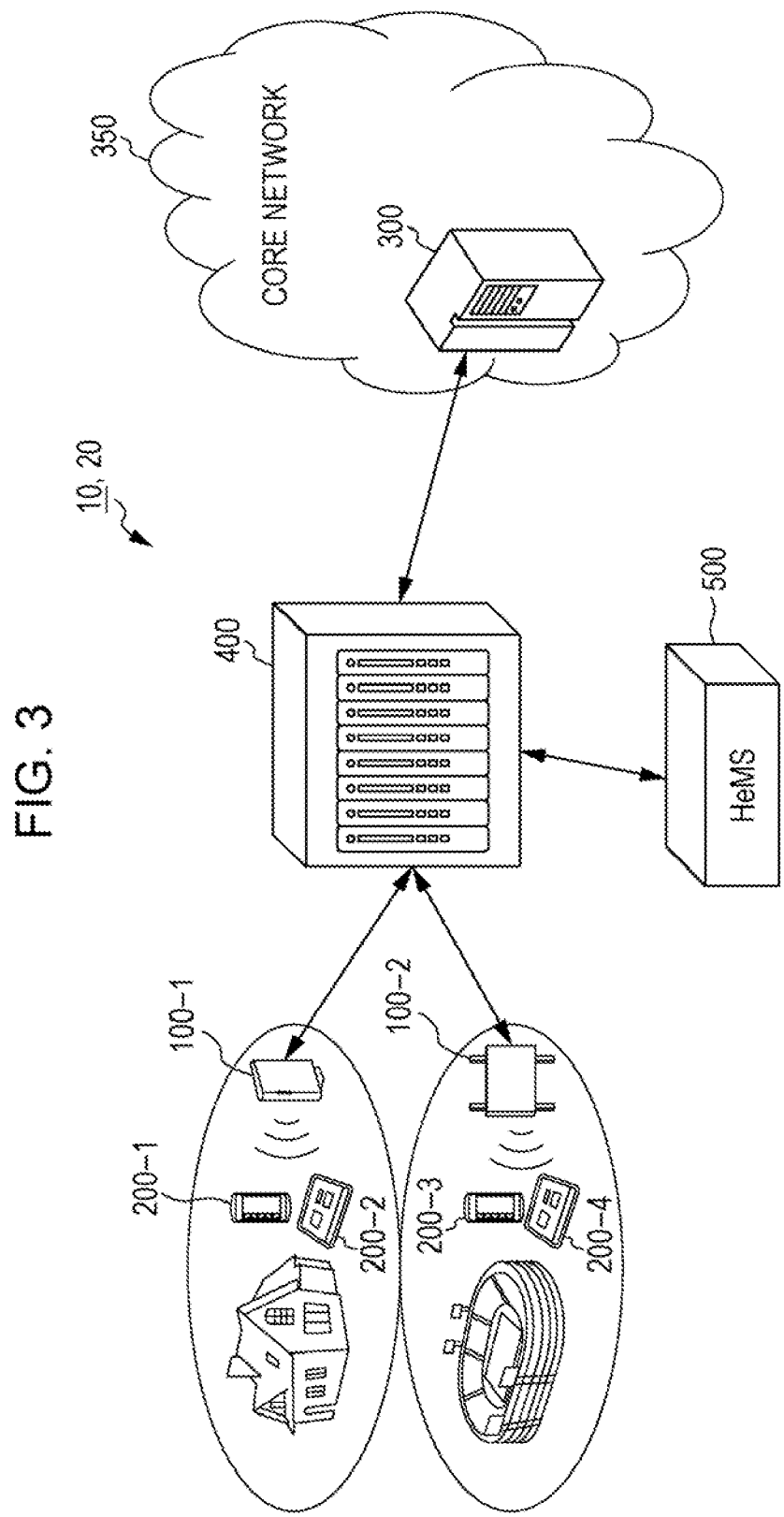
FIG. 3 is a diagram illustrating a configuration example of a communication system.

FIG. 3 is a diagram illustrating a configuration example of the communication system 10 (or the femtocell system 20). Each of the HeNBs 100-1 and 100-2 is installed in a house, a stadium, or the like, whereby a user is able to receive provision of various services in a house, a stadium, or the like.

Note that as illustrated in FIG. 3, to the communication system 10 (or the femtocell system 20), an HeNB management system (HeMS) 500 may be further connected. The HeMS 500 is a server device for monitoring the HeNB-GW 400, for example, and able to monitor a connection condition with respect to the HeNB-GW 400 for each of the HeNBs 100-1 to 100-4 (or the MMEs 300-1 to 300-3), for example.

<Configuration Example of HeNB-GW>

Figure 4:
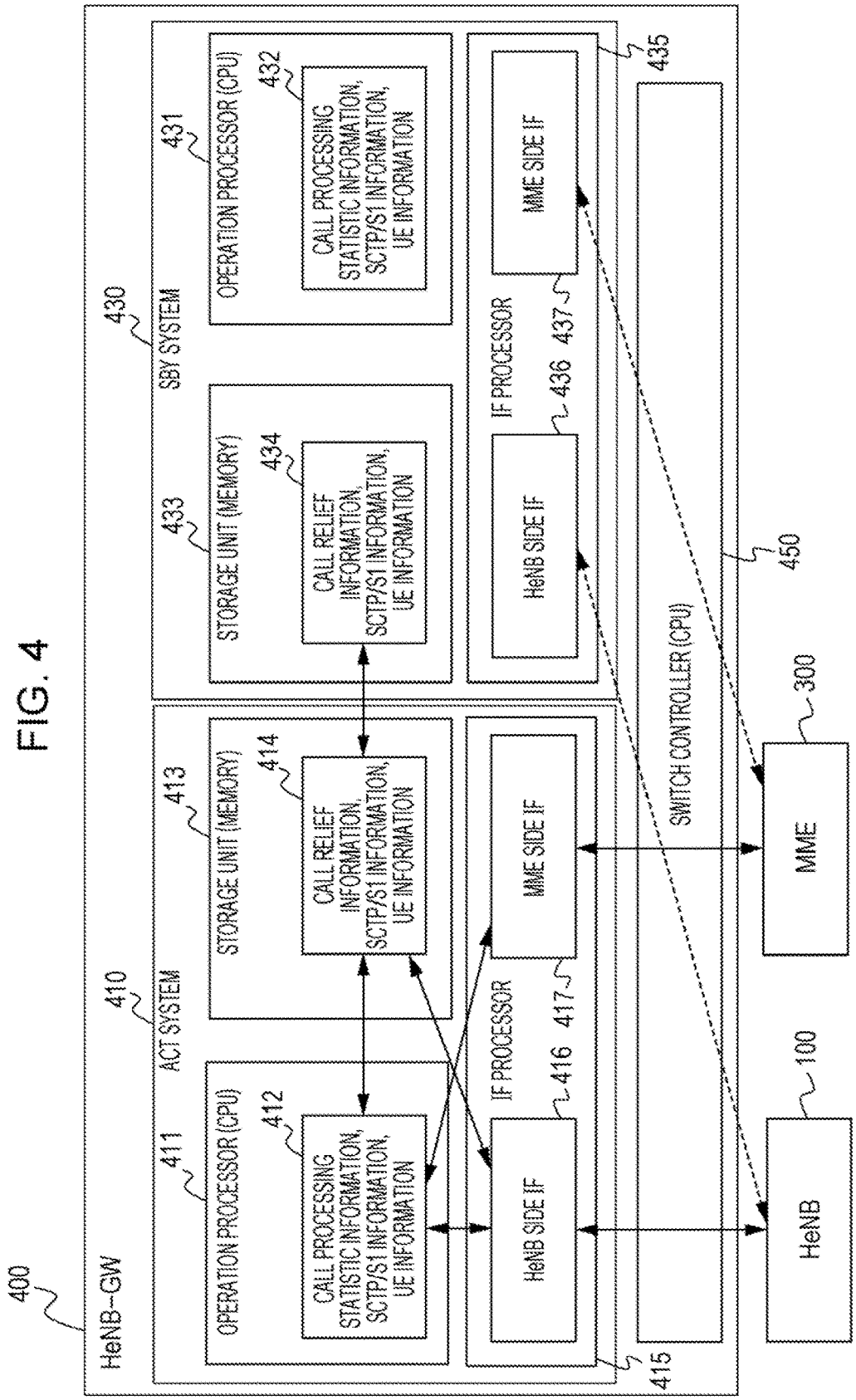
FIG. 4 is a diagram illustrating a configuration example of an HeNB-GW.

Next, a configuration example of the HeNB-GW 400 will be described. FIG. 4 is a diagram illustrating a configuration example of an HeNB-GW 400.

The HeNB-GW 400 includes an ACT system 410, an SBY system 430, and the switching controller 450.

The ACT system 410 includes an operation processor 411, a storage unit 413, and an interface (IF) processor 415. Furthermore, the IF processor 415 includes an HeNB side IF 416 and an MME side IF 417. The SBY system 430 also includes an operation processor 431, a storage unit 433, and an IF processor 435. Furthermore, the IF processor 435 also includes an HeNB side IF 436 and an MME side IF 437.

The operation processor 411 receives messages exchanged between the HeNB 100 and the MME 300 via the IF processor 415, acquires the above-described statistic information based on the received message, and determines an order of establishment of a communication session in accordance with the statistic information, for example. As information on the message, SCTP information, S1 information, UE information, and the like may be cited, for example. In the HeNB 100 and the MME 300, an S1-MME protocol is used, for example, and information used by the protocol is the S1 information. The S1 information is transmitted using SCTP. The S1 information and the SCTP information may be the same, for example. The UE information is information on the UE 200, for example. This information is also transmitted using SCTP. The operation processor 411 generates call relief information as information indicating the order of establishment of the communication session and stores the generated call relief information in the storage unit 413 together with the SCTP information, S1 information, and UE information, for example.

Furthermore, the operation processor 411 transfers a message received from the HeNB side IF 416 to the MME side IF 417, or transfers a message received from the MME side IF 417 to the HeNB side IF 416, for example. With this, in the ACT system of the HeNB-GW 400, for example, relay of messages is enabled between the HeNB 100 and the MME 300.

The storage unit 413 stores the call relief information, the SCTP information, or the like, and before switching from the ACT system 410 to the SBY system 430, transfers the stored information to the storage unit 433 of the SBY system 430, for example. This kind of transfer may be performed by the operation processor 411 having received an instruction from the switching controller 450, for example.

The HeNB side IF 416 exchanges messages with the HeNB 100. The HeNB side IF 416 outputs the messages received from the HeNB 100 to the operation processor 411 and transmits the messages received from the operation processor 411 to the HeNB 100, for example. The HeNB side IF 416 may exchange the SCTP information or the like contained in the messages with the storage unit 413, for example.

The MME side IF 417 exchanges messages with the MME 300. The MME side IF 417 outputs the messages received from the MME 300 to the operation processor 411 and transmits the messages received from the operation processor 411 to the MME 300, for example.

The operation processor 431 in the SBY system 430 establishes a communication session, after the switching, in accordance with the order of establishment indicated in the call relief information stored in the storage unit 433, for example. The operation processor 431 transmits a restart message to the MME 300 or the HeNB 100 in accordance with the order of establishment, for example. With this, the communication session is sequentially established. Details of this will be described using an operation example. Thereafter, the SBY system 430 becomes a new ACT system 430, and the operation processor 431 receives messages transmitted from the MME 300 via the MME side IF 437 and transmits the received messages to the HeNB 100 via the HeNB side IF 436, for example, similarly to the operation processor 411 in the ACT system. Furthermore, the operation processor 431 receives messages transmitted from the HeNB 100 via the HeNB side IF 436 and transmits the received messages to the MME 300 via the MME side IF 437, for example. The operation processor 431 may extract, as appropriate, various types of information from the received message similarly to the operation processor 411 and store the extracted information in the storage unit 433. Furthermore, the operation processor 431 may acquire statistic information and determine the order of establishment of the communication session based on the acquired statistic information, for example.

The storage unit 433 stores therein the call relief information received from the storage unit 413 in the ACT system 410, the SCTP information received from the operation processor 431, or the like, for example.

The HeNB side IF 436 exchanges messages with the HeNB 100. Furthermore, the MME side IF 437 exchanges messages with the MME 300.

Upon detecting a failure with the ACT system 410 or receiving an instruction from the HeMS 500, for example, the switching controller 450 determines to perform switching from the ACT system 410 to the SBY system 430 and gives an instruction of the switching to the ACT system 410 and the SBY system 430 to perform the switching from the ACT system 410 to the SBY system 430. For example, the operation processor 411 in the ACT system 410 receives this instruction, generates the call relief information, and transfers the generated call relief information to the SBY system 430. In the operation processor 431 in the SBY system 430, a communication session is established in accordance with the call relief information.

<Switching from ACT System to SBY System>

Figure 5:
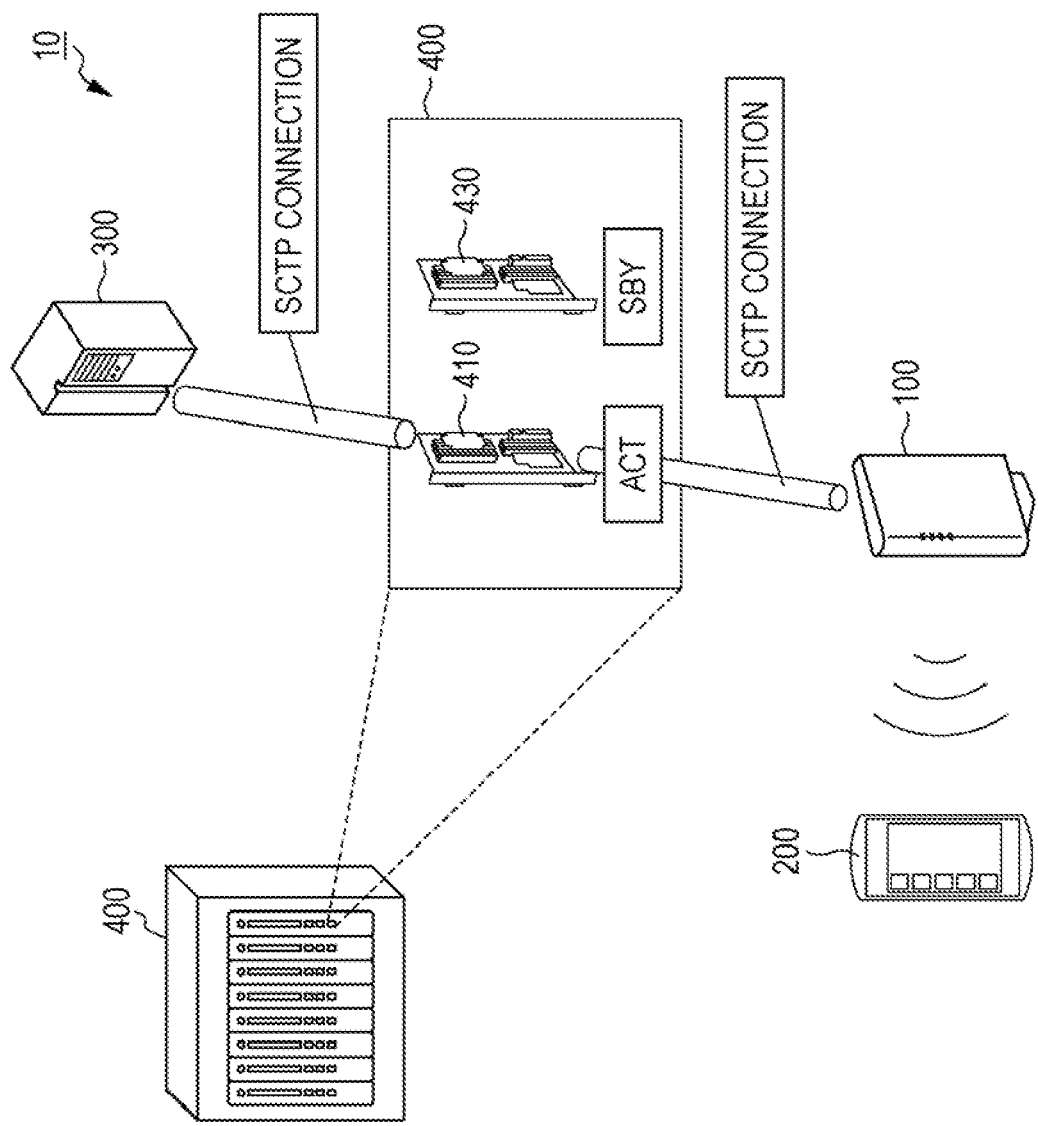
FIG. 5 is a diagram illustrating an example of SCTP connection.

Next, the switching from the ACT system 410 to the SBY system 430 will be described. FIG. 5 is a diagram illustrating an example of a state before the switching.

The HeNB-GW 400 includes a plurality of cards, for example. One or a plurality of cards of the ACT system 410 and one or a plurality of cards of the SBY systems 430 are inserted. The cards of the ACT system 410 and the cards of the SBY systems 430 have configurations illustrated in FIG. 4, for example.

As illustrated in FIG. 5, the cards of the ACT system 410 are connected to the MME 300 and the HeNB 100 by SCTP. Messages for establishing SCTP are exchanged between the MME 300 and the HeNB 100 with the cards of the ACT system 410 relayed, whereby SCTP connection is established to enable exchange of SCTP-related messages between the MME 300 and the HeNB 100 with the cards relayed.

FIGS. 6A and 6B are diagrams illustrating states before the switching and after the switching, respectively. As illustrated in FIGS. 6A and 6B, the cards of the ACT system 410 before the switching become the cards of the SBY system 430 after the switching, and the cards of the SBY system 430 before the switching become the cards of an ACT (new ACT) system after the switching. After the switching, the established SCTP connection is maintained, and the cards of the new ACT system 430 relays messages or the like exchanged between the MME 300 and the HeNB 100, for example.

<Priority Order at Switching>

In the present second embodiment, when a plurality of communication sessions are established, after the switching from the ACT system 410 to the SBY system 430, with respect to each of the HeNB 100 (or each communication session), an order is determined at which reconnection thereof is performed.

FIGS. 7A to 7C are diagrams illustrating examples of the orders. The priority order is the highest in FIG. 7A and becomes lower in the order of FIG. 7B and FIG. 7C.

When the UE 200 performs wireless communication with the HeNB 100 and information is exchanged between the UE 200 and the MME 300, even after the switching to the new ACT 430, calls set for the UE 200 and the MME 300 are to be relieved with priority over others. In this case, for example, the UE 200 performs wireless communication with the HeNB 100 and connection is made from the UE 200 to the MME 300. In this case, for example, in order to relieve calls with respect to the UE 200 which is connected and avoid disconnection of the calls due to the switching, the priority is the highest compared with others.

A case with the next highest priority is a state in which the UE 200 is not connected to the HeNB 100 but the UE 200 is able to be connected to the HeNB 100, and connection is made from the HeNB 100 to the MME 300, as illustrated in FIG. 7B. This corresponds to a case where the UE 200 is in an idle state or a power-off state and is able to be connected to the HeNB 100 by an operation of a user, for example. In this case, similarly to FIG. 7A, a communication session by SCTP is established between the HeNB 100 and the MME 300, and the UE 200 is connected to the HeNB 100, whereby exchange of messages is immediately enabled between the UE 200 and the MME 300. In this case, although the priority order is lower than in FIG. 7A, the UE 200 is in a usable state even if the user starts using immediately after the switching from the ACT system 410 to the SBY system 430.

A case with the lowest priority is a state in which the power source of the HeNB 100 is turned off as illustrated in FIG. 7C. This corresponds to a case where SCTP connection is not made between the HeNB-GW 400 and the HeNB 100, for example. With respect to the HeNB 100 in this state, the priority order of SCTP reconnection is the lowest.

In the present second embodiment, the HeNB-GW 400 detects a state of SCTP connection in accordance with the statistic information of call processing (for example, FIGS. 7A to 7C) and performs ordering of the HeNB 100 (or communication sessions) in accordance with the detected state, for example. An operation example will be described below.

Operation Example

Next, an operation example will be described. Firstly, an operation example of ordering in accordance with the statistic information of call processing will be described. Next, an example of an entire sequence and other will be described.

1. Operation Example of Ordering

Figure 8A:
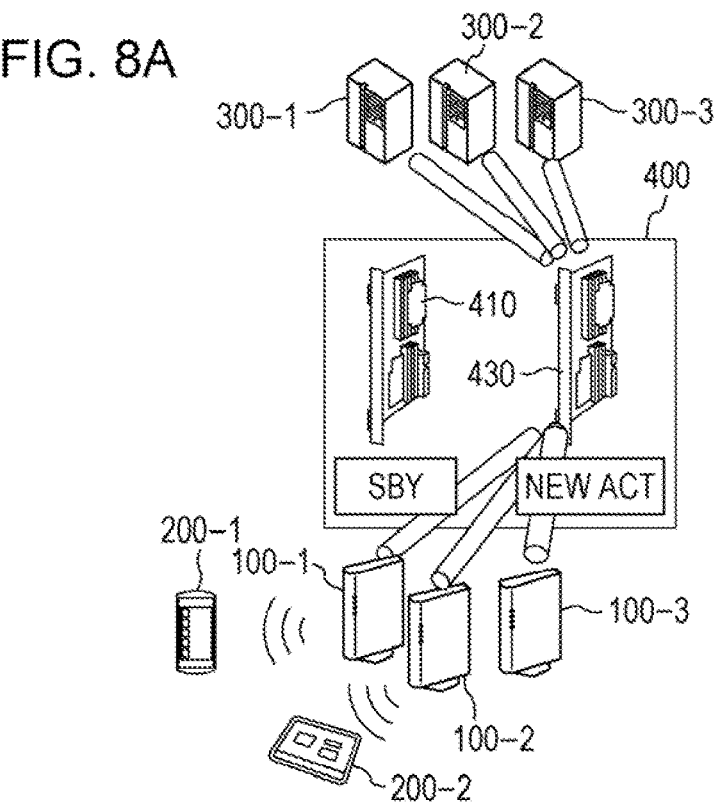
FIG. 8A is a diagram illustrating an example of SCTP connection.
Figure 8B:
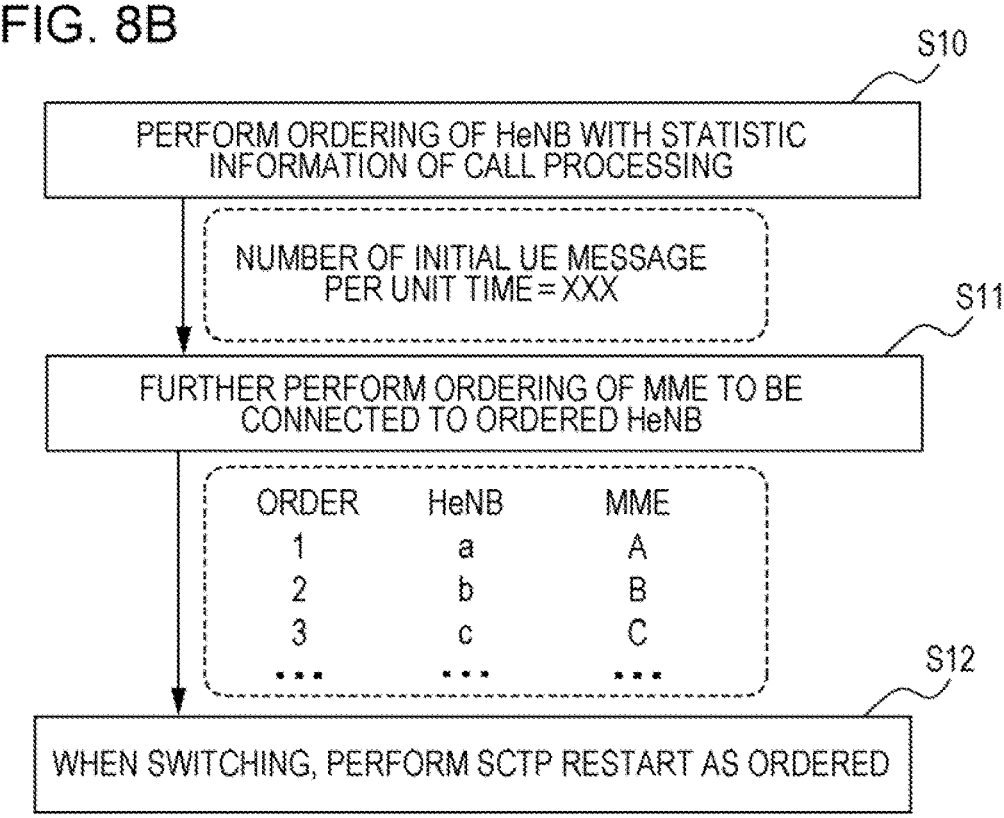
FIG. 8B is a flowchart illustrating an operation example.

FIGS. 8A and 8B are diagrams related to an operation example of ordering in accordance with the statistic information of call processing. Out of these, FIG. 8A illustrates an example of SCTP connection after the switching and FIG. 8B is a flowchart illustrating an operation example of ordering in accordance with the statistic information.

The HeNBs 100-1 to 100-3 perform wireless communication with the UEs 200-1 and 200-2 before the switching and exchange messages with the MMEs 300-1 to 300-3 via the HeNB-GW 400 by SCTP.

The HeNB-GW 400 performs ordering of the HeNBs 100-1 to 100-3 based on the statistic information of call processing (S10). Specifically, the ACT system 410 in the HeNB-GW 400 (the example in FIG. 8A illustrates a state after the switching; before the switching, the ACT system 410 is true) calculates (or counts) a number of messages exchanged between the HeNB 100 and the MME 300 for each unit time and performs ordering of the HeNBs 100-1 to 100-3 in accordance with the number, for example. The messages include an initial UE message, for example. The initial UE message is a message transmitted from the HeNB 100 to the MME 300 when the UE 200 performs connection processing with the HeNB 100, for example. With this, the HeNB-GW 400 is able to count a number of the UEs 200-1 and 200-2 connected to the HeNBs 100-1 to 100-3 and is able to perform ordering of the HeNBs 100-1 to 100-3 in accordance with the number of the UEs 200-1 and 200-2 connected thereto, for example. The HeNB-GW 400 detects connection states in the HeNB 100 (or connection states of communication sessions from the HeNB 100 to the MME 300) based on the statistic information of call processing and performs ordering of the HeNB 100 (or the communication sessions) in accordance with the connection states, for example.

After the ordering of the HeNBs 100-1 to 100-3, the HeNB-GW 400 further performs ordering of the MMEs 300-1 to 300-3 connected to the HeNBs 100-1 to 100-3 (S11). For example, the old ACT system 410 in the HeNB-GW 400 performs ordering including ordering of the MMEs 300-1 to 300-3 connected to the HeNBs 100-1 to 100-3 and generates call relief information containing information of this ordering. FIG. 8B illustrates an example of call relief information 414. In the example in FIG. 8B, "a" which is the HeNB 100-1 is connected to "A" which is the MME 300-1 and the priority order thereof is the highest. Next, "b" which is the HeNB 100-2 is connected to "B" which is the MME 300-2 and the priority order thereof is the next highest, and so on.

Next, after the switching, the HeNB-GW 400 performs SCTP restart in accordance with the ordering (S12). For example, the new ACT 430 transmits an SCTP restart message to the HeNB 100-1 and the MME 300-1 the priority order of which is the highest, and after transmitting the message, transmits an SCTP restart message to the HeNB 100-2 and the MME 300-2 the priority order of which is the next highest. The new ACT 430 sequentially transmits SCTP restart messages in accordance with the ordering.

Figure 9A:
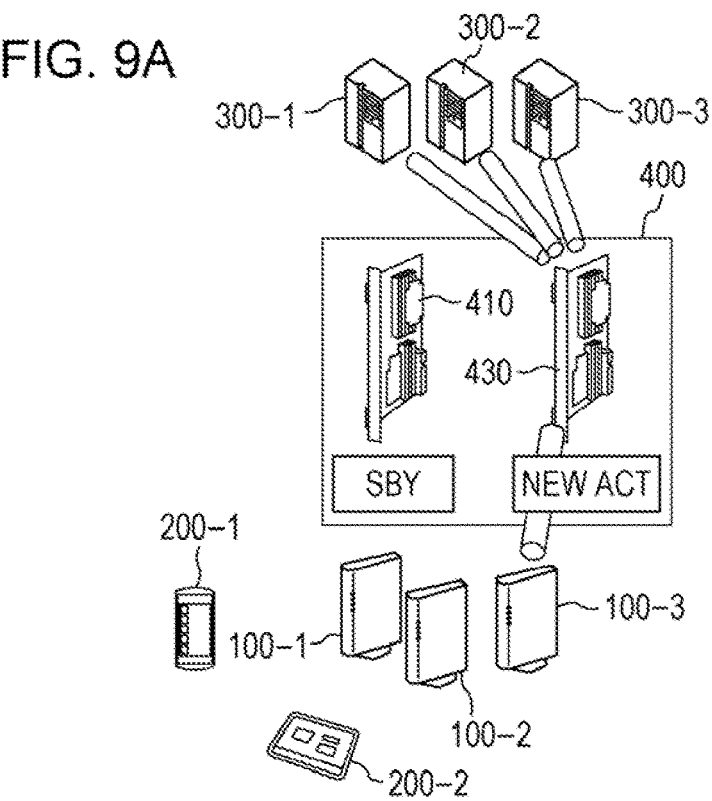
FIG. 9A is a diagram illustrating an example of SCTP connection.

Meanwhile, before the switching, there are some cases where the HeNB-GW 400 is not able to detect an initial UE message. FIG. 9A illustrates an example of such a case.

For example, as illustrated in FIG. 9A, to the HeNB 100-3, the UEs 200-1 and 200-2 are not connected. In such a case, the HeNB 100-3 does not transmit an initial UE message. With this, in the HeNB-GW 400, the number of initial UE messages for each unit time with respect to the HeNB 100-3 is "0". However, in this case, the HeNB 100-3 is connected to the MMEs 300-1 to 300-3 by SCTP and is in a state being able to exchange SCTP-related messages.

Furthermore, for example, there are some cases where the power sources of the HeNBs 100-1 to 100-3 are turned off. In such a case, the HeNBs 100-1 to 100-3 do not transmit an initial UE message, and the number of initial UE messages for each unit time is "0". The example in FIG. 8A illustrates an example in which the power sources of the HeNBs 100-1 and 100-2 are turned off. In this case, the HeNBs 100-1 and 100-2 do not exchange messages related to SCTP connection with the MMEs 300-1 to 300-3 and SCTP connection is not made therebetween.

Figure 9B:
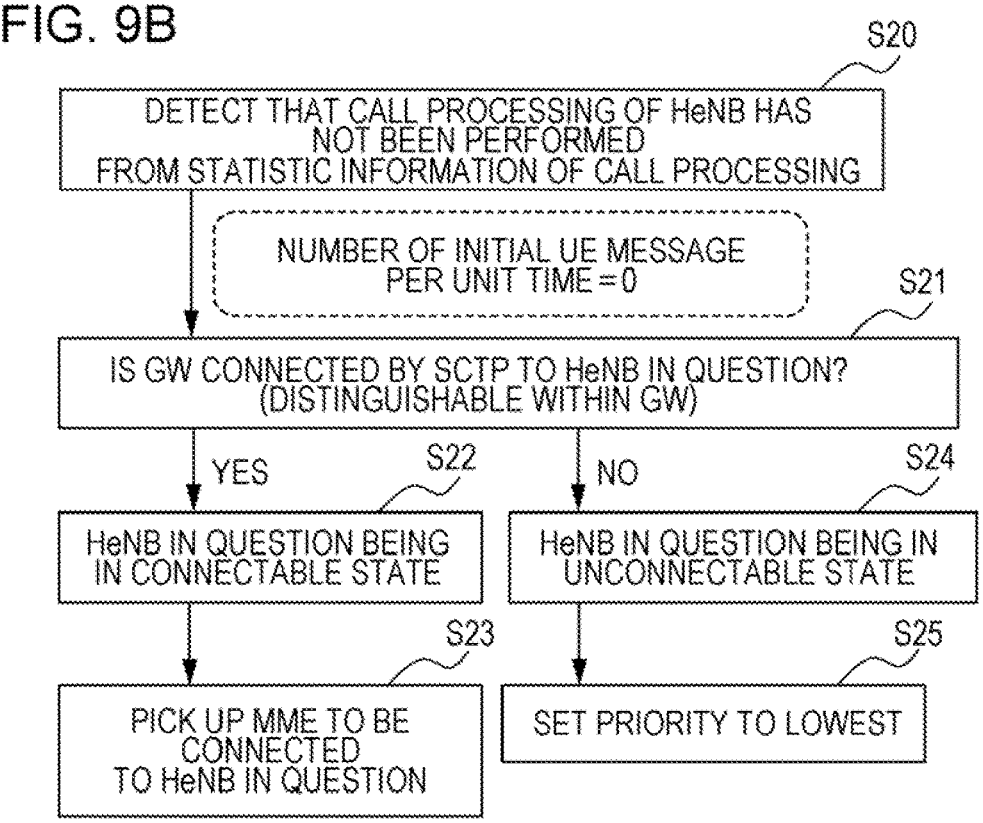
FIG. 9B is a flowchart illustrating an operation example.

FIG. 9B is a flowchart illustrating an operation example for the above-described case. When the HeNB-GW 400 has detected that call processing of any of the HeNB 100 is not performed from the statistic information of call processing (S20), the HeNB-GW 400 detects whether SCTP connection is made with the one of the HeNB 100 (S21). For example, when the old ACT system 410 has detected any of the HeNB 100 for which the number of initial UE messages for each unit time is "0", the old ACT system 410 detects whether SCTP connection is made with the one of the HeNB 100. Whether or not SCTP connection is made is detected based on whether the HeNB-GW 400 has received a heartbeat message from the one of the HeNB 100, for example. The heartbeat message is an SCTP-related message for checking whether the device functions in a normal state, for example. For example, heartbeat messages (or SCTP heartbeat messages; hereinafter may be referred to as "heartbeat messages") are exchanged between the HeNB 100-3 and the MMEs 300-1 to 300-3 which are connected by SCTP and are not transmitted from the HeNB 100-1 and 100-2 whose power sources are turned off. With this configuration, from the messages, the HeNB-GW 400 is able to distinguish whether SCTP connection is made. At S20 and S21, for example, the HeNB-GW 400 detects a connection state in the HeNB 100 based on the statistic information of call processing (or a connection state of communication sessions from the HeNB 100 to the MME 300) and performs ordering of the HeNB 100 (or communication sessions) in accordance with the detected connection state.

When the HeNB 100-3 is connected by SCTP (Yes at S21), the HeNB 100-3 is in a connectable state (S22), and the HeNB-GW 400 picks up any of the MMEs 300-1 to 300-3 to be connected to the HeNB 100-3 (S23). For example, the old ACT system 410 adds the HeNB 100-3 to the call relief information. At this time, the old ACT system 410 ranks the HeNB 100-3 to the next to one of the HeNB 100 with the lowest priority out of the HeNB 100 that has been ordered using the statistic information of call processing (S11 in FIG. 8B). With this, one of the HeNB 100 that does not communicate with the UE 200 but is connected by SCTP (for example, FIG. 7B) is able to be ranked to the next to the HeNB 100 that has been ordered in a state connected with the UE 200 under communication (for example, FIG. 7A).

Returning now back to FIG. 9B, by contrast, when the corresponding one of the HeNB 100 is not connected by SCTP (No at S21), the HeNB-GW 400 determines the one of the HeNB 100 to be in an unconnectable state (S24) and ranks the one of the HeNB 100 to the lowest (S25). With this, to the next to the one of the HeNB 100 that does not communicate with the UE 200 but is connected by SCTP (for example, FIG. 7B), the one of the HeNB 100 that is not connected by SCTP (for example, FIG. 7C) is able to be ranked, for example.

2. Example of Entire Sequence

Figure 10:
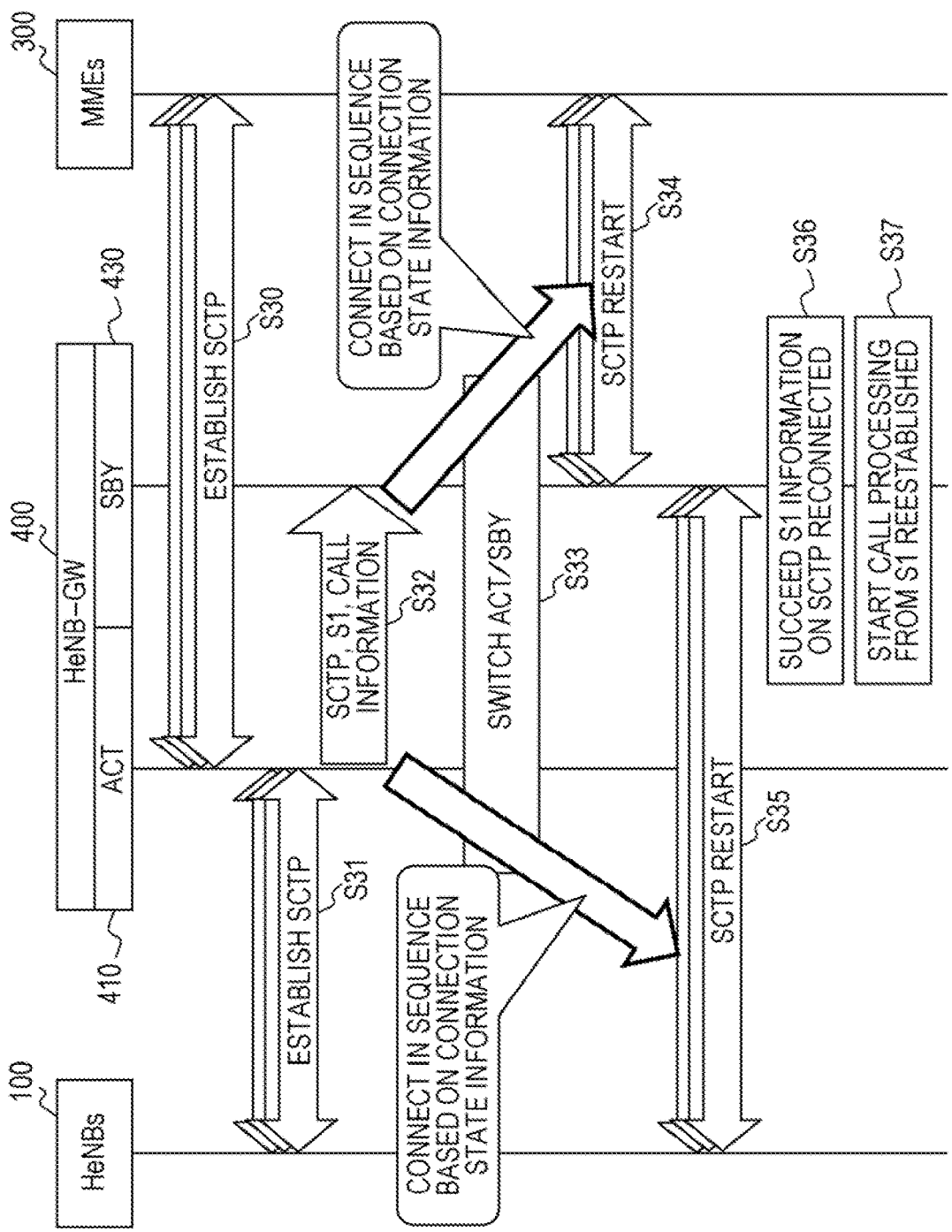
FIG. 10 is a sequence diagram illustrating an operation example.

Next, an example of an entire sequence including the above-described ordering will be described. FIG. 10 illustrates an example of the operations. FIG. 10 illustrates an example in which the HeNB 100 and the MME 300 each are present in plurality. However, in the description below, each one of the HeNB 100 and the MME 300 may be individually presented.

The HeNB 100 and the MME 300 exchange messages related to SCTP connection, thereby performing SCTP connection (S30, S31). The ACT system 410 in the HeNB-GW 400 relays the messages. The messages include the initial UE message, for example.

Next, the HeNB-GW 400 determines to perform the switching from the ACT system 410 to the SBY system 430 and transfers SCTP information, S1 information, information related to calls, or the like, which have been acquired from the messages exchanged between the HeNB 100 and the MME 300, from the ACT system 410 to the SBY system 430 (S32). The HeNB-GW 400 also transfers the call relief information from the ACT system 410 to the SBY system 430.

Next, the HeNB-GW 400 performs switching from the ACT system 410 to the SBY system 430 (S33). The above-described processing of ordering is performed after determination of the switching in the HeNB-GW 400 and before the switching (S33), for example.

After the switching, the SBY system 430 in the HeNB-GW 400 transmits an SCTP restart message to the HeNB 100 and the MME 300 in the order in accordance with the ordering (S34, S35).

Note that, instead of the SCTP restart message, a heartbeat message may be used. A heartbeat message is a message used for checking connection, for example, as described above. For example, the SBY system 430 generates a heartbeat message to be transmitted to the MME 300 from the HeNB 100 and sequentially transmits the message to the MME 300 in accordance with the ordering. Furthermore, the SBY system 430 generates a heartbeat message to be transmitted to the HeNB 100 from the MME 300 and sequentially transmits the message to the HeNB 100 in accordance with the ordering.

Next, the SBY (new ACT) system 430 succeeds the S1 information on reconnected SCTP (S36) and starts call processing from reconnected SCTP connection (S37). For example, the SBY (new ACT) system 430 succeeds the S1 information or the like transmitted from the ACT (old ACT) system 410 to maintain SCTP connection (or communication sessions) established between the MME 300 and the HeNB 100 and starts call processing on the maintained SCTP connection.

<Flowchart of Ordering>

FIG. 11 is a flowchart illustrating an operation example for the ordering. FIG. 11 is a summary of the descriptions with reference to FIG. 8A to FIG. 9B.

Upon starting processing (S50), the HeNB-GW 400 calculates a number "X" of initial UE messages for each unit time for each HeNB from statistic information of call processing (S51).

Next, the HeNB-GW 400 distinguishes whether the calculated "X" is "0" (S52). When the calculated "X" is not "0" (Y at S52), the HeNB-GW 400 performs ordering of the HeNB 100 in accordance with the number of "X" (S53).

Next, the HeNB-GW 400 further performs ordering of the MME 300 to be connected to the HeNB 100 which has been ordered (S54). For example, the ACT system 410 generates the call relief information containing information of the ordering and outputs the generated call relief information to the SBY system 430.

By contrast, when the calculated "X" is "0" (N at S52), the HeNB-GW 400 distinguishes whether the corresponding one of the HeNB 100 is connected by SCTP (S57). For example, the SCTP information includes presence or absence of a heartbeat message transmitted from the one of the HeNB 100, and based on this presence or absence, the ACT system 410 may distinguish presence or absence of SCTP connection.

When the one of the HeNB 100 is connected by SCTP (Y at S57), the HeNB-GW 400 further performs ordering of the one of the HeNB 100 including one of the MME 300 that is connected to the one of the HeNB 100 by SCTP (S58). For example, the ACT system 410 generates the call relief information including the order of the one of the HeNB 100 and transfers the generated call relief information to the SBY system 430.

By contrast, when the one of the HeNB 100 is not connected by SCTP (N at S57), the HeNB-GW 400 ranks the priority order of the one of the HeNB 100 to the lowest and transfers the call relief information containing this information to the SBY system 430.

Next, the HeNB-GW 400 performs the switching from the ACT system 410 to the SBY system 430 and connects the HeNB 100 and the MME 300 as ordered (S55). For example, the new ACT system 430 receives call relief information from the old ACT system 410, and in accordance with the ordering contained in the received call relief information, transmits an SCTP restart message to the HeNB 100 and the MME 300.

Thereafter, the HeNB-GW 400 ends a series of processing (S56).

Note that the HeNB-GW 400 may not transmit an SCTP restart message to one of the HeNB 100 whose power source is turned off. In this case, the HeNB-GW 400 transmits an SCTP restart message to one of the MME 300 that is able to be connected by SCTP to the one of the HeNB 100. The one of the MME 300 that has received the message is able to start preparation for SCTP connection with the one of the HeNB 100. When the message is a heartbeat message, similarly, the one of the MME 300 that has received the heartbeat message is able to start preparation for establishment of a communication session with the one of the HeNB 100.

The HeNB-GW 400 performs the above-described ordering with respect to each of the HeNB 100 (S54), whereby the priority order of one of the HeNB 100 that is used by a user is able to be ranked to the highest (for example, FIG. 7A). Furthermore, the HeNB-GW 400 is able to rank one of the HeNB 100 that is not used by a user but is connected by SCTP to the next highest (for example, S58 in FIG. 11 and FIG. 7B) and rank one of the HeNB 100 whose power source is turned off to the lowest in priority (for example, S59 in FIG. 11 and FIG. 7C).

As described above, before the switching, the HeNB-GW 400 according to the present second embodiment sets the priority order of reconnection (for example, S53, S58, and S59 in FIG. 11). With this, a call to be relieved is able to be relieved quickly to avoid an interruption in provision of a service due to the switching and continue the provision of the service to a user, for example.

Furthermore, before the switching, the HeNB-GW 400 performs ordering in accordance with a number of the UEs 200 connected to the HeNB 100 (for example, S53 and S54 in FIG. 11). This enables to establish a communication session in order starting with one of the HeNB 100 that is connected to the greatest number of the UEs 200 and thus enables to continue provision of a service to many users connected to one of the HeNB 100 as described above, for example. With this, in the HeNB-GW 400 in the present embodiment, disconnection due to call processing with respect to a user is also able to be minimized.

Other Embodiment

In the second embodiment, as an example of a message used as statistic information of call processing, an initial UE message has been described. As this kind of message, in addition, an initial setup context response message, an initial setup context request message, or the like may be used. Any of these messages is a message in an S1-MME interface that is exchanged when SCTP connection is established between the HeNB 100 and the MME 300. The HeNB-GW 400 may count a number of this kind of messages and use the number as statistic information of call processing.

Furthermore, as described in FIG. 4, each of the operation processors 411, 431 and the switching controller 450 may be a central processing unit (CPU) and each of the storage units 413, 433 may be a memory. In this case, the HeNB-GW 400 is operated by three CPUs (or computers) of the CPU 411 in the ACT system 410, the CPU 431 in the SBY system 430, and the switching controller 450, for example. With this kind of hardware configuration, the above-described operations may be performed. Note that, instead of a CPU, a controller such as a micro-processing unit (MPU), a field-programmable gate array (FPGA), a digital signal processor (DSP), or the like may be used.

Furthermore, in the second embodiment, the description has been made taking SCTP as an example. Instead of SCTP, a transfer protocol such as TCP may be used, for example. In this case, the HeNB-GW 400 may calculate a number of the UEs 200 connected to the HeNB 100 based on messages related to the transfer protocol such as TCP that are exchanged between the MME 300 and the HeNB 100.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A communication relay device configured to relay communication between a plurality of terminal devices and a plurality of wireless network side devices via a plurality of wireless base stations, the communication relay device comprising:
    at least one memory; and
    at least one processor coupled to the at least one memory, respectively, and the at least one processor configured to:
    relay messages exchanged between a first wireless base station of the plurality of wireless base stations and a first wireless network side device of the plurality of wireless network side devices, or between a second wireless base station of the plurality of wireless base stations and a second wireless network side device of the plurality of wireless network side devices;
    acquire, from the messages, first statistic information related to call processing between the first wireless base station and the first wireless network side device and second statistic information related to call processing between the second wireless base station and the second wireless network side device;
    determine, in accordance with a number of first terminal devices of the plurality of terminal devices coupled to the first wireless base station included in the first statistic information and a number of second terminal devices of the plurality of terminal devices coupled to the second wireless base station included in the second statistic information, an order of establishment of a first communication session between the first wireless base station and the first wireless network side device and a second communication session between the second wireless base station and the second wireless network side device; and
    establish, when switching of a path of relaying the communication in the communication relay device is performed, the first communication session and the second communication session in accordance with the order of establishment.

2. The communication relay device according to claim 1, wherein the at least one processor is configured to
    detect a connection state of the first wireless base station based on the first statistic information,
    detect a connection state of the second wireless base station based on the second statistic information, and
    determine the order of establishment of the first communication session and the second communication session in accordance with the connection states.

3. The communication relay device according to claim 2, wherein the at least one processor is configured to
    detect, based on the first statistic information and the second statistic information, any one of a first state in which a first terminal device of the first terminal devices communicates with the first wireless base station, a second terminal device of the second terminal devices communicates with the second wireless base station, the first terminal device is coupled to the first wireless network side device, and the second terminal device is coupled to the second wireless network side device, a second state in which the first terminal device is in a communicable state with the first wireless base station, the second terminal device is in a communicable state with the second wireless base station, the first wireless base station is coupled to the first wireless network side device, and the second wireless base station is coupled to the second wireless network side device, or a third state in which a power source of the first wireless base station or the second wireless base station is turned off, and determine the order of establishment in order of the first state, the second state, and the third state.

4. The communication relay device according to claim 3, wherein, when the first wireless base station and the second wireless base station are in the first state, the at least one processor is configured to determine the order of establishment of the first communication session and the second communication session in order starting with one of the first wireless base station or the second wireless base station that is coupled to a greater number of the first terminal devices or the second terminal devices, based on the first statistic information and the second statistic information.

5. The communication relay device according to claim 3, wherein, when a number of the first terminal devices or the second terminal devices coupled to the first wireless base station or the second wireless base station, respectively, is "0", the at least one processor is configured to detect the second state or the third state.

6. The communication relay device according to claim 1, wherein the at least one processor is configured to
    detect a connection state of the first communication session based on the first statistic information,
    detect a connection state of the second communication session based on the second statistic information, and
    determine the order of establishment of the first communication session and the second communication session in accordance with the connection states.

7. The communication relay device according to claim 1, wherein the at least one processor is configured to transmit a message for establishing the first communication session to the first wireless network side device or a message for establishing the second communication session to the second wireless network side device in accordance with the order of establishment, after switching of the path of relaying the communication.

8. The communication relay device according to claim 1, wherein the first communication session and the second communication session are communication sessions established by exchange of messages related to stream control transmission protocol (SCTP).

9. The communication relay device according to claim 7, wherein the at least one processor is configured to transmit a stream control transmission protocol (SCTP) restart message in accordance with the order of establishment.

10. A communication relay method of a communication relay device configured to relay communication between a plurality of terminal devices and a plurality of wireless network side devices via a plurality of wireless base stations, the communication relay method comprising:

relaying messages exchanged between a first wireless base station of the plurality of wireless base stations and a first wireless network side device of the plurality of wireless network side devices, or between a second wireless base station of the plurality of wireless base stations and a second wireless network side device of the plurality of wireless network side devices;

acquiring, from the messages, first statistic information related to call processing between the first wireless base station and the first wireless network side device and second statistic information related to call processing between the second wireless base station and the second wireless network side device;

determining, in accordance with a number of first terminal devices of the plurality of terminal devices coupled to the first wireless base station included in the first statistic information and a number of second terminal devices of the plurality of terminal devices coupled to the second wireless base station included in the second statistic information, an order of establishment of a first communication session between the first wireless base station and the first wireless network side device and a second communication session between the second wireless base station and the second wireless network side device; and establishing, when switching of a path of relaying the communication in the communication relay device is performed, the first communication session and the second communication session in accordance with the order of establishment, by at least one processor.

11. A computer-readable non-transitory recording medium storing a program that causes a computer to execute a procedure, the computer-readable non-transitory recording medium in a communication relay device configured to relay communication between a plurality of terminal devices and a plurality of wireless network side devices via a plurality of wireless base stations, the procedure comprising:

relaying messages exchanged between a first wireless base station of the plurality of wireless base stations and a first wireless network side device of the plurality of wireless network side devices, or between a second wireless base station of the plurality of wireless base stations and a second wireless network side device of the plurality of wireless network side devices;

acquiring, from the messages, first statistic information related to call processing between the first wireless base station and the first wireless network side device and second statistic information related to call processing between the second wireless base station and the second wireless network side device;

determining, in accordance with a number of first terminal devices of the plurality of terminal devices coupled to the first wireless base station included in the first statistic information and a number of second terminal devices of the plurality of terminal devices coupled to the second wireless base station included in the second statistic information, an order of establishment of a first communication session between the first wireless base station and the first wireless network side device and a second communication session between the second wireless base station and the second wireless network side device; and establishing, when switching of a path of relaying the communication in the communication relay device is performed, the first communication session and the second communication session in accordance with the order of establishment.

\* \* \* \* \*